United States Patent

Cvacho et al.

[15] 3,637,064
[45] Jan. 25, 1972

[54] APPARATUS FOR AND METHOD OF TRANSFERRING ARTICLES

[72] Inventors: Daniel S. Cvacho; Harry W. Lee, Jr.; Field I. Robertson, Jr., all of Chesterfield County, Va.

[73] Assignee: Reynolds Metals Company, Richmond, Va.

[22] Filed: May 23, 1969

[21] Appl. No.: 827,380

[52] U.S. Cl....................................198/32, 198/22, 198/25
[51] Int. Cl..........................................B65g 47/30
[58] Field of Search........................198/22, 32, 25, 209, 210

[56] References Cited

UNITED STATES PATENTS

| | | | |
|---|---|---|---|
| 2,801,651 | 8/1957 | Street | 198/32 |
| 3,158,251 | 11/1964 | Skala | 198/32 |
| 3,231,061 | 1/1966 | Borkmann | 198/25 |

*Primary Examiner*—Harvey C. Hornsby
*Assistant Examiner*—Stephen P. Garbe
*Attorney*—Glenn, Palmer, Lyne, Gibbs & Thompson

[57] ABSTRACT

An apparatus for and method of transferring articles, such as cylindrical cans, from a plurality of can forming devices to a high speed can trimming machine whereby cans are transferred in a positive and efficient manner and shutdown of one or more of the plurality of can forming devices will not require stopping of the can trimming machine.

30 Claims, 9 Drawing Figures

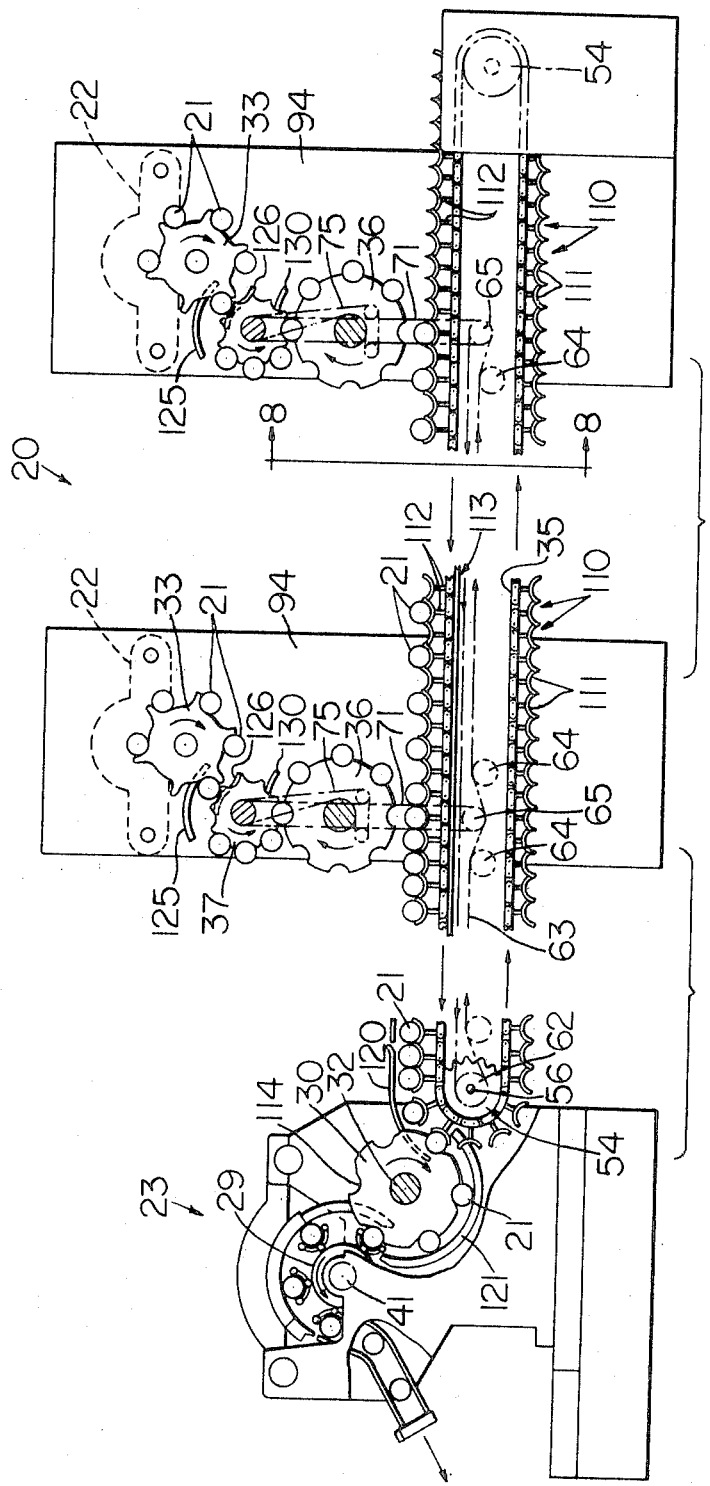

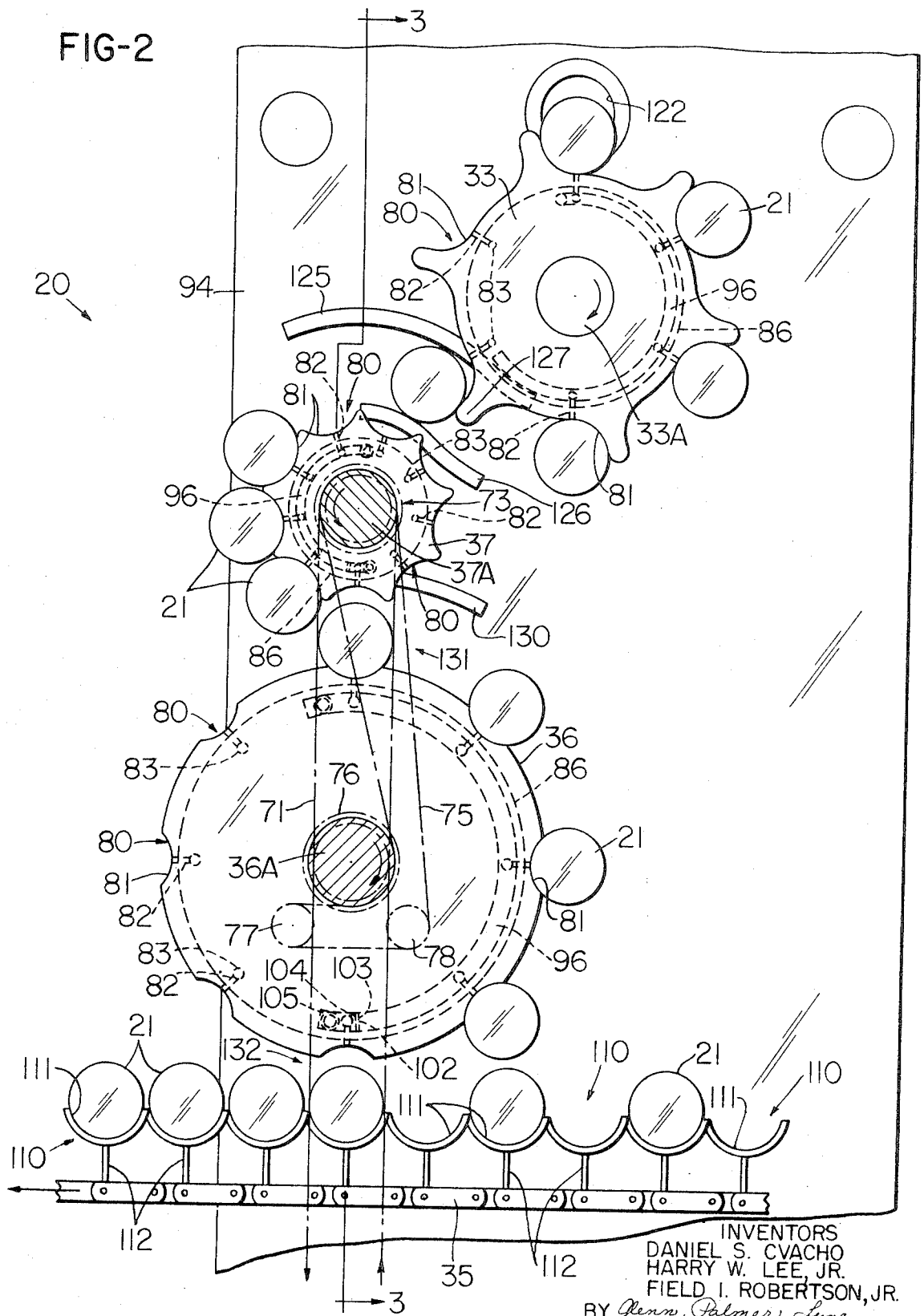

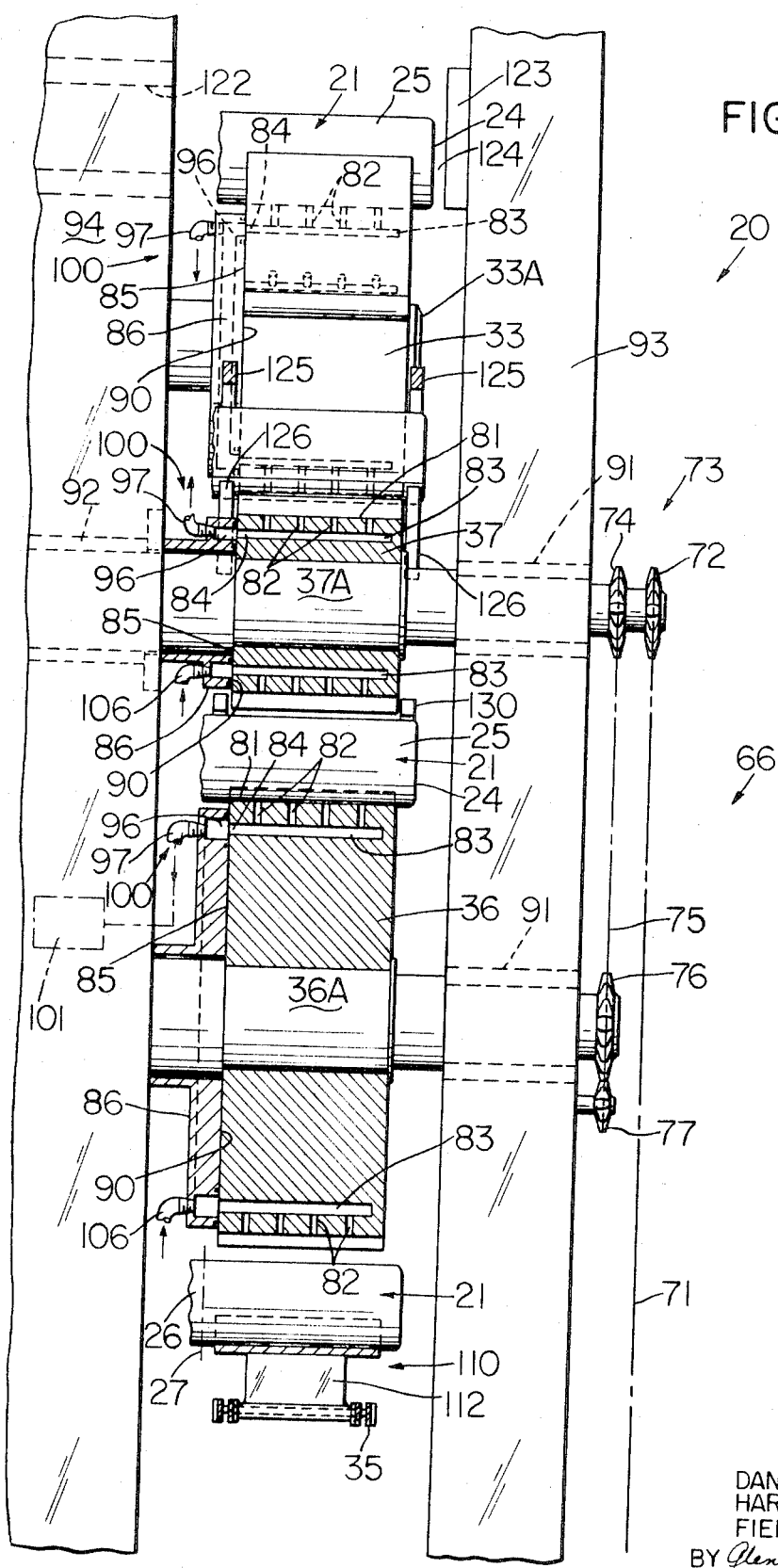

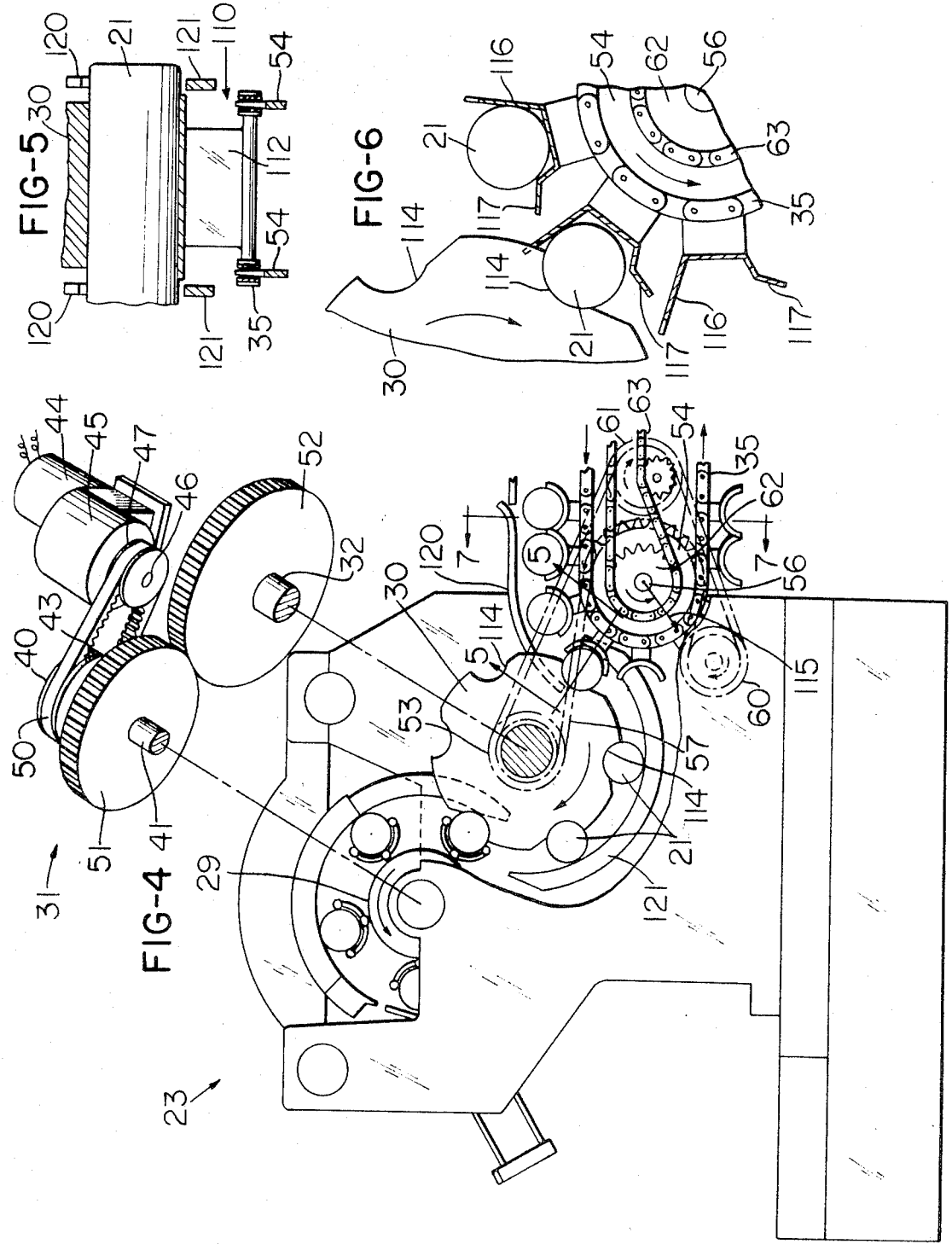

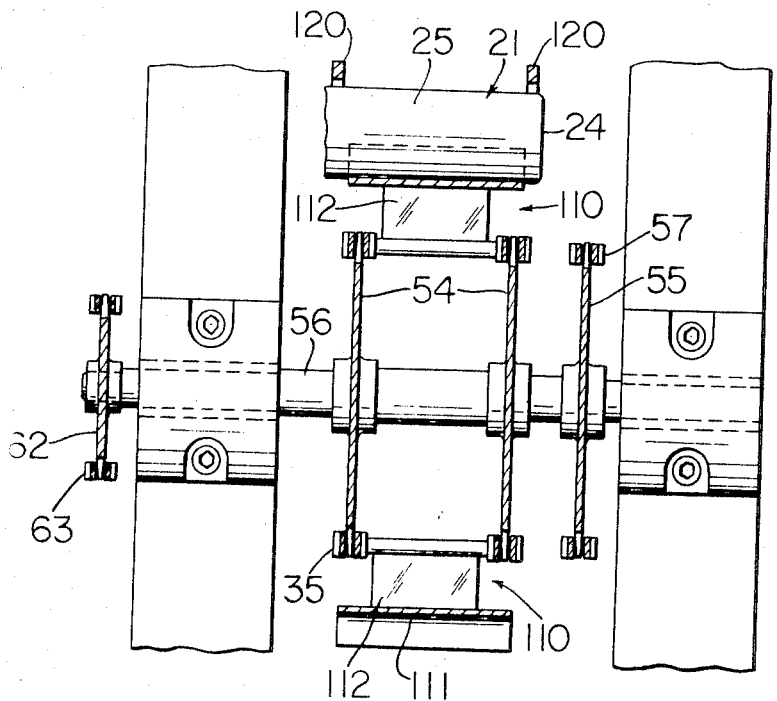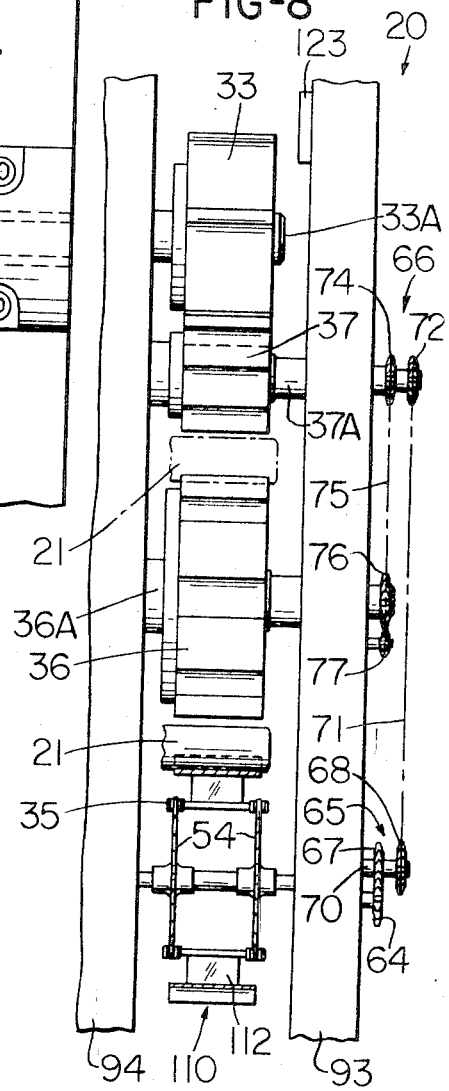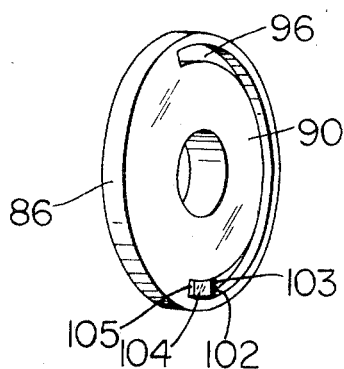

3,637,064

APPARATUS FOR AND METHOD OF TRANSFERRING ARTICLES

BACKGROUND OF THE INVENTION

In the manufacture of cans, such as metal cans containing aluminum, a metal disc is often drawn and ironed in an associated forming machine or device to define a single piece body comprised of a bottom wall and an adjoining cylindrical sidewall terminating in a jagged annular end portion defining an open end. Each can is then transferred to a can trimming machine which trims the jagged end portion from the can body.

It is common practice to transfer cans from a can forming machine to a can trimming machine using a transfer apparatus which is operatively connected between such machines in such a manner that any malfunction of one machine requires that both of such machines be shut down. This practice results in a very inefficient and hence expensive operations.

In addition, even the fastest can forming machine is inherently a comparatively slow machine which is prone to more frequent stoppage and with the development of reliable high speed can trimming machines capable of trimming in excess of 600 cans per minute it is necessary to solve the basic problem of providing a transfer apparatus capable of being operatively connected to a plurality of can forming devices so that a high speed trimming machine may be operated at its maximum capacity. Further, the transfer apparatus should operate so that shutdown of one or more of the associated can forming machines will not require shutdown of the high speed can trimming machine.

SUMMARY

This invention provides an economical apparatus for and method of transferring articles, such as metal cans, from a plurality of can forming devices to a high speed can trimming machine whereby cans are transferred in a precise, positive, and high speed manner and the shutdown of one or more of the plurality of can forming devices will not require stopping of the can trimming machine.

Other devices, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a side elevation with certain parts shown schematically and other parts broken away illustrating one exemplary embodiment of a transfer apparatus and method of this invention which is utilized to transfer articles such as metal cans from a plurality of two can forming machines to a high speed can trimming machine;

FIG. 2 is an enlarged view particularly illustrating the manner in which formed cans are transferred from a forming machine to a horizontal conveyor comprising the transfer apparatus;

FIG. 3 is a view taken essentially on the line 3—3 of FIG. 2;

FIG. 4 is a fragmentary view with parts shown in perspective and other parts in elevation particularly illustrating the drive for the can trimming machine and the manner in which such drive is utilized to drive a portion of the improved transfer apparatus of this invention;

FIG. 5 is a fragmentary view taken essentially on the line 5—5 of FIG. 4;

FIG. 6 is a fragmentary view with parts in cross section and particularly illustrating substantially trapezoidal can supporting cradles which may be provided on the conveyor in lieu of the semicylindrical cradles illustrated in FIGS. 1 and 2 of the drawings;

FIG. 7 is a fragmentary view taken essentially on the line 7—7 of FIG. 4;

FIG. 8 is a fragmentary view taken essentially on the line 8—8 of FIG. 1; and

FIG. 9 is a perspective view of a plate associating with a conveyor feed wheel of the transfer apparatus wherein such plate has a groove therein which associates with an associated fluid system to support cans on such feed wheel by vacuum.

DESCRIPTION OF ILLUSTRATED EMBODIMENTS

Reference is now made to FIG. 1 of the drawings wherein an exemplary embodiment of the apparatus and method of this invention is illustrated and designated generally by the reference numeral 20. The apparatus 20 is particularly adapted to transfer articles such as metal cans 21 from a plurality of input devices, presented in this example as a plurality of can forming devices or machines 22, to a high speed can trimming apparatus or machine 23. The operation of the transfer apparatus 20 is such that the shutdown of one or more of a plurality of forming machines 22 used in association with the can trimming machine or trimmer 23 will not require shutdown of the trimmer 23 enabling the transfer apparatus 20 to continue the transfer of cans to the trimmer 23 in a positive, precise, and high speed manner.

In this example of the invention each exemplary can 21 which is transferred by the apparatus 20 comprises a bottom wall 24 adjoined by an integral and substantially cylindrical sidewall 25 which terminates in a jagged end portion, see FIG. 3. The jagged end portion is trimmed from the can body by the trimmer 23 trimming an annulus 26 from the can body substantially along a dotted line indicated at 27. Each jagged end portion is formed on its associated can 21 by the action of an associated forming machine and inasmuch as each forming machine 22 may be of a well-known construction such machine will not be described in detail. Each forming machine 22 is capable of forming, by drawing and ironing, generally of the order of 200 cans per minute.

The trimmer 23 may be of any suitable construction so as to enable trimming of the jagged end portion or annulus 26 from each can 21 in an efficient and high speed manner. The trimmer 23 is capable of trimming cans in high volume production quantities exceeding 600 cans per minute whereby, in order to utilize the trimmer with optimum efficiency, it is necessary to provide a plurality of forming machines 22 which together are capable of feeding the trimmer 23 in quantities approaching its capacity. Further, the transfer apparatus and method 20 of this invention enables the machines 22 and 23 to be operated so that shutdown of certain ones of the machines 22 will not require shutdown of the trimmer 23, as previously mentioned.

In order to understand the operation of the transfer apparatus and method 20 of this invention it is not necessary to present in detail the construction and operation of the trimmer 23. However, where a greater understanding of the operation of the trimmer 23 is desired, reference may be made to patent application, Ser. No. 745,474 which presents the construction and operation of the trimming machine 23 in great detail.

The trimmer 23 comprises a main star wheel 29 and an infeed star wheel 30 which are driven by a suitable drive system 31 in a manner which will be described in detail subsequently. The drive system 31 comprises a drive shaft 32 which has the infeed wheel 30 keyed thereto for direct driving thereof and the shaft 32 also directly drives a portion of the transfer apparatus 20 of this invention.

The transfer apparatus 20 comprises a plurality of pickup wheels 33 corresponding in number to the plurality of can forming machines 22 and each pickup wheel is directly driven in synchronized relation by an associated machine 22 independently of the other forming machines and independently of the remainder of the transfer apparatus 20. Each pickup wheel 33 is suitably fixed to an associated shaft 33A and the shaft may be suitably supported for substantially frictionless rotation, see FIG. 2.

The apparatus 20 also comprises a conveyor such as a chain conveyor 35 which is particularly adapted to feed cans 21 to the trimmer 23 and a plurality of conveyor feed wheels 36 also corresponding in number to the plurality of forming machines 22 and each feed wheel 36 feeds cans to the conveyor 35 in a predetermined spaced relation. A plurality of intermediate wheels 37 is provided and each intermediate wheel 37 is arranged intermediate or between an associated pickup wheel 33 and feed wheel 36 and each intermediate wheel 37 transfers cans between its associated pickup wheel 33 and feed wheel 36. Each wheel 36 and 37 is suitably fixed to an associated shaft 36A and 37A respectively and each of such shafts may be supported for substantially frictionless rotation.

The wheels 33, 36 and 37 comprising the transfer apparatus 20 are commonly referred to as star wheels. Accordingly, such wheels may also be referred to as star wheels later in this specification at locations where it is believed such reference will facilitate the understanding of this invention.

The conveyor 35, feed wheels 36, and intermediate wheels 37 are driven by the trimmer 23 in synchronized relation while providing positive transfer of cans from one component to another in an efficient and high speed manner. Each pickup wheel 33 is driven in an independent manner by as associated forming machine 22, as previously mentioned. Nevertheless, the construction and operation of each intermediate wheel 37 is such that each wheel 37 is adapted to serially receive each can from its associated pickup wheel 33 and transfer each can to its associated feed wheel 36 in a positive manner.

The drive system 31 for the trimmer 23 and for the conveyor 35, feed wheels 36, and intermediate wheels 37 is of the utmost simplicity and provides synchronized movements of these components while operating the can trimmer 23 at high speed. The drive system 31 comprises a sheave 40, see FIG. 4, suitably fixed to one end of a shaft 41 which defines the main drive shaft for the main star wheel 29 of the trimmer 23. The sheave 40 has a plurality of equally spaced teeth 43 provided about its periphery. A suitable drive motor shown as an electric drive motor 44 is provided, and the drive motor is connected to a speed reducer unit 45 which has a shaft 46 extending outwardly therefrom. The shaft 46 has another sheave 47 suitably fixed thereto and the sheave 47 has a plurality of spaced teeth corresponding to the teeth 43 of the sheave 40 so as to enable a toothed belt 50 to be operatively connected around the sheaves 40 and 47 in a known manner.

The shaft 41 has a gear 51 suitably fixed thereto which operatively engages a gear 52 which is fixed to one end of the drive shaft 32 for the infeed star wheel 30. The shaft 32 has a sprocket wheel or sprocket 53 fixed thereto and the sprocket 53 drives the chain conveyor 35 and each wheel 36 and 37 as will now be described in detail.

As seen in FIGS. 1 and 4, the chain conveyor 35 has a plurality of supporting wheels including a pair of wheels 54 arranged at each end thereof. The wheels 54 arranged adjacent the trimmer 23 are fixed on a common shaft 56 and have a sprocket wheel or sprocket 55 suitably fixed thereto, by fixing sprocket 55 to shaft 56, and a drive chain 57 is provided and operatively connected around the sprockets 53 and 55, see FIG. 7. The shaft 56 is arranged horizontally and supported for substantially frictionless rotation.

The transfer apparatus 20 has a pair of sprockets 60 and 61 which are suitably rotatably supported in position so that upon operatively engaging the drive chain 57 therearound and around the sprockets 53 and 55 the wheels 54 of the chain conveyor 35 are rotated counterclockwise with clockwise rotation of the sprocket 53 and infeed star wheel 30 to thereby provide the desired infeed. In addition, it will be seen from FIG. 4 that the sprockets 60 and 61 are positioned to assure that the chain 57 contacts the sprocket 55 over an arc which is sufficiently large to minimize stress concentrations on a few sprocket teeth.

The transfer apparatus 20 has a smaller diameter sprocket wheel 62 fixed to the common shaft 56 and a second drive chain 63 is provided and extends substantially longitudinally along the central portion of the chain conveyor 35. The longitudinal drive chain 63 is supported by a plurality of spaced sprockets 64 and a plurality of sprocket wheel assemblies 65 are provided and operatively engaged by the chain 63 for a purpose to be subsequently described. The assembly 65 which is remote from the trimmer 23 also helps support the chain 63.

The apparatus 20 includes a plurality of transverse chain drive systems or drives corresponding in number to the number of forming machines 22 and each being designated generally by the reference numeral 66. Each transverse drive system 66 includes the sprocket wheel assembly 65 which has a pair of sprocket wheels 67 and 68 arranged in parallel relation and fixed on a common shaft 70, see FIG. 8.

The sprocket 67 engages the driving chain 63 and the sprocket 68 has another sprocket chain 71 which is wrapped therearound and around an associated wheel 72 of a sprocket wheel assembly 73 fixed to the supporting shaft 37A for an associated intermediate wheel 37, see FIGS. 2, 3, and 8. The assembly 73 has another sprocket 74 fixed thereto and arranged parallel to the sprocket 72 and another chain 75 is provided and operatively engages a sprocket 76 which is fixed to an associated shaft 36A. Thus, it is seen that the drive chain 63 drives chain 71 which rotates an intermediate wheel 37 and its sprocket assembly 73 which in turn drives chain 75 and hence feed wheel 36.

The drive chain 76 also has a pair of sprocket wheels 77 and 78 which are suitably supported on associated shafts. The sprockets hold the chain 75 in position so that it contacts sprocket 76 over a substantial arc while also assuring that with counterclockwise rotation of assembly 73 and intermediate wheel 37 the sprocket 76 and feed wheel 36 rotate in a clockwise manner.

Thus, it is seen that upon energizing the motor 44 power is supplied to drive the trimmer 23 and simultaneously drive chains 57, 63, 71 and 75 whereby the conveyor 35 and each feed wheel 36 and intermediate wheel 37 are driven in a synchronized manner from a single power source. Further, by utilizing chain drives, precision rotation of components is provided in a positive and nonslipping manner.

As will be apparent particularly from FIG. 2 of the drawings and as previously mentioned, each wheel 33, 36 and 37 is in the form of a star wheel and has a plurality of can-supporting cradles provided therein. Although the cradles on these star wheels are not identical they are very similar; accordingly, for ease of presentation, each cradle on every wheel will be designated generally by the reference numeral 80.

Each cradle 80 has a roughly semicylindrical configuration and is defined in the outer circumference of its associated wheel. Each cradle 80 comprises a can-supporting surface 81 which has a plurality of passages 82 exiting therefrom, see FIGS. 2 and 3, and for a purpose which will now be described in detail. The passages 82 in each cradle have their exits or outlets aligned in a rectilinear path which is parallel to the longitudinal axis of such cradle. Each passage 82 communicates with a manifold 83 which is also arranged substantially parallel to the longitudinal axis of its associated supporting cradle 80 and each manifold 83 is in the form of a blind opening having an open end 84 which exits a planar vertical surface 85 which in this example comprises an end surface of an associated star wheel.

Each star wheel 33, 36, and 37 is supported so that its planar surface 85 engages an associated fluid supply plate 86 and for a purpose which will be apparent hereinafter. The detailed configurations of the various star wheels and plates 86 will be slightly different; however, the manner in which a particular star wheel operatively associates with its plate 86 is substantially identical in each star wheel and plate combination whereby for ease of presentation the component portions of each plate 86 and members operatively associating therewith will be given identical reference numerals. In addition, the perspective view of the plate 86 shown in FIG. 9 may be considered as representing a typical plate for each wheel 33, 36 and 37 although the detailed configuration illustrated is that of the plate 86 associating with a typical feed wheel 36.

Each plate 86 is suitably supported in a fixed position adjacent as associated star wheel so that a planar surface 90 thereof engages an associated planar surface 85 of the star wheel and it will be seen that the plates 86 are fixed with their surfaces 90 in a common vertical plane. In addition, the shafts 33A, 36A, and 37A are each suitably supported by spaced antifriction bearing assemblies 91 and 92 carried on a structural member 93 and 94 so that the respective star wheels 33, 36, and 37 rotate with their planar surfaces 85 in a common vertical plane which coincides with the plane of surfaces 90, see FIG. 3. It will also be appreciated that suitable circumferential seals may be provided to prevent fluid leakage from between the planar surfaces 85 and 90.

As seen in FIG. 9 of the drawings the typical plate 86 has a contoured vacuum groove 96 provided therein. The vacuum groove 96 is connected in fluid flow communication with one end of a vacuum line 97 which is fixed to the plate 86 in a fluid tight manner and as shown at 100, and each line 97 has its opposite end connected to a suitable vacuum source 101 which is indicated schematically in FIG. 3. As each star wheel is rotated by its associated drive chain, the open end 84 of its manifold 83 registers in a fluid tight manner over the slot 96 for a predetermined angular distance as determined by the configuration and arrangement of the particular star wheel whereby each can 21 is supported within its associated cradle 80 by vacuum acting against its cylindrical sidewall 25.

To assure that each can 21 is ejected from its star wheel in a precise and positive manner at the point where such ejection is desired, the plate 86 may have a thin wall 102 provided therein with one surface 103 of such wall defining an end wall of the vacuum groove 96 and an opposed surface 104 of wall 102 defining an end wall of a limited length arcuate pressure groove 105 defined in the plate 86. Once the cradle 80 of a particular star wheel is rotated by its chain drive to a position where vacuum is to be released, the open end 84 of the manifold 83 associating with a particular can moves out of register with the vacuum groove 96 and across the thin wall 102 and into register with the pressure groove 105 whereupon the vacuum holding such can is broken and a fluid such as air under pressure may be applied to help move the can away from its cradle 80. The air under pressure may be supplied to the pressure groove 105 through a line 106 and from any suitable pressure source, not shown.

Although in this example of the invention the description has proceeded by illustrating the small arcuate pressure groove 105 in each supply plate 86 which is used to help release each can 21 from its associated cradle 80 once the cradle and can are rotated to the ejection position, it will be appreciated that the pressure system need not necessarily be provided in order to transfer cans away from each star wheel and transfer may also be achieved simply by releasing the vacuum holding the particular can in position and allowing the can to drop by gravity. Such a technique may be more applicable to certain star wheels, such as wheels 33, than to others.

As previously explained the particular presentation of FIG. 9 illustrates the plate 86 associating with the feed star wheel 36. The arrangement and angular distance over which each air supply groove extends in a particular plate will vary depending upon which star wheel associates with the particular plate.

The conveyor 35 comprises an endless chain conveyor and has a plurality of equally spaced supports 110 for supporting the cans 21, see FIGS. 1 and 2. Each support 110 comprises a substantially semicylindrical can supporting portion 111 and an arm 112 suitably fixed to associated links of the chain conveyor 35. The conveyor 35 is supported in position so that it has a central portion 113 supported to provide substantially horizontal movement of the supports 110 and the conveyor feed wheels 36 are synchronized to deposit cans on the supports 110 during the horizontal movement thereof.

Each feed wheel 36 comprising the exemplary transfer apparatus 20 is synchronized to deposit a can every other support 110. Thus, as will be apparent from FIG. 1 of the drawings, the conveyor 35 has cans 21 supported in position in every other support 110 between the forming machines 22 and in every support between the near forming machine 22 and the trimmer 23.

It will also be appreciated that any desired number of a plurality of forming machines or devices 22 may be provided and designated by the number "N." With "N" machines 22 the feed wheels 36 of the transfer apparatus 20 would be synchronized so that each feed wheel would deposit a can every "Nth" support. Thus, if three devices 22 were to be utilized each feed wheel would deposit a can 21 every third support; if four devices 22 were to be used, each feed wheel would deposit a can 21 every fourth support, etc. With this arrangement it will be appreciated that a maximum number of cans 21 may be fed onto the conveyor 35 and in the event of breakdown of one of the forming machines 22, for example, the other machines would continue to operate and still feed cans to the trimmer 23, whereby the trimmer 23 could be operated at near its top capacity at all times.

As previously indicated, the trimmer 23 has an infeed star wheel 30 which is adapted to receive cans from the conveyor 35 in a high speed manner. The spacing of the supports 110 is such that it corresponds to the spacing of article supporting cradles 114 comprising the infeed star wheel 30. The radius, indicated at 115 in FIG. 4, of the end supporting sprockets 54 for the chain conveyor 35 and position thereof is correlated with the radius and position of the infeed star wheel 30 and with the length of the arms 112 and configuration of the supports 111 to assure smooth transfer of cans 21 from the conveyor 35 to the infeed star wheel 30.

Each support 110 illustrated in FIGS. 1 and 2 of the drawings utilize a semicylindrical cradle 111. However, to assure an even smoother transfer of cans 21 from the conveyor 35 to the infeed star wheel 30 the can supporting cradles may be in the form of substantially trapezoidal supports 116, as viewed in cross section in FIG. 6. Each cradle 116 preferably has an inclined forward portion 117 which serves as a ramp for transferring cans 21 to the cradles 114 of the infeed star wheel 30 and the cradles 116 may be used on the conveyor 35 in lieu of the cradles 111. Each support 110, whether comprised of a semicylindrical cradle 111 or a substantially trapezoidal cradle 116 supports its associated can so that the can is nested therewithin and held by gravity.

As each can 21 is moved from a support 110 to the infeed star wheel 30, the top portion of each can is guided into the infeed star wheel by guides 120, see FIGS. 4 and 5. Similarly, the bottom portion of each can 21 is guided and partially supported by a pair of guides 121 suitably supported in a fixed position on the trimmer 23.

As will be apparent from FIGS. 2 and 3 of the drawings each can 21 is propelled through an opening 122 provided in a structural member 94 arranged adjacent an associated forming machine 22 and in position over an aligned cradle 80 of an associated pickup star wheel 33 which is driven in synchronized relation by the forming machines. Each can 21 may be propelled through opening 122 by using any suitable technique. It may be moved axially by the action of a punch comprising the forming machine 22 or may be moved by any other suitable technique such as by air impinging against the inside surface of the bottom wall of can 21.

As each can 21 is moved in position over an aligned cradle 80 of the associated pickup star wheel 33 it strikes a suitable stop plate 123 and may rebound slightly a distance as indicated at 124 whereupon the action of the vacuum acting through the openings 82 acts against the can sidewall 25 and urges it tightly against its cradle 80. Each can 21 is initially held by vacuum on the star wheel 33 as previously described. To provide for any error between the opening 22 and the positioning of a cradle 80 therebeneath each cradle 80 comprising the pickup star wheel 33 has a supporting area which is comparatively large and extends over a substantial arc with the vacuum passages 82 provided adjacent one end portion thereof.

The transfer system 20 has a pair of cooperating guides 125 and 126 provided in association with each pickup wheel 33 and intermediate wheel 37 and the arrangement of the lower guide 126 is such that even with the vacuum released a small distance away from the terminal end of guide 126, a portion 127 of the star wheel is effective in nudging each can 21 up a ramplike portion of the guide 126 and into an associated cradle 80 of the associated intermediate wheel 37 whereby each can is assured of being positioned in an associated cradle of the intermediate star wheel 37. It will also be seen that a guide 130 is provided between each intermediate star wheel 37 and the feed star wheel 36 to assure positive and precise transfer between wheels 37 and 36.

The guides 120, 121, 125, 126, and 130 are made of any suitable material such as teflon, or the like, to provide an antifriction surface as well as help prevent marring of the cans 21.

Thus, it is seen that the transfer apparatus and method of this invention provides each pickup wheel 33 which is driven by its associated forming device 22 independently of the remainder of the transfer apparatus. The intermediate wheels 37 and feed star wheels 36 together with the conveyor 35 are driven in a synchronized manner by the can trimming machine or trimmer 23. To assure that a cradle of each intermediate star wheel 37 is always available to receive a can 21 from its feed wheel, the intermediate star wheel 37 has at least the same number or a greater number of cradles than the pickup star wheel 33. In addition, each intermediate star wheel 37 is driven by the trimmer 23 so that it rotates at the same speed as its associated pickup wheel 33 or at a greater speed. Also, each intermediate wheel 37 may be provided so that its cradles 80 adjoin each other and essentially with a narrow edge portion between the sidewalls of adjoining cradles whereby with each wheel 37 having a greater number of cradles than an associated pickup wheel 33 and being rotated at a speed equal to or greater than such pickup wheel each can 21 is assured of being transferred between associated wheels 33 and 37 even without synchronization therebetween. In this example of the invention each intermediate wheel 37 rotates 1.2 times faster than its associated pickup wheel 33.

It will also be appreciated that the intermediate wheels 37 and feed wheels 36 are operated so that their can transferring cradles are arranged in vertically aligned relation at the point of transfer, essentially as illustrated at 131 in FIG. 2 of the drawings, to provide smoother transfer from one wheel to the other. Similarly, the movement of the supports 110 of the chain conveyor 35 is synchronized with each feed wheel 36 so that a precise vertical transfer is provided from each feed wheel 36 to an associated support 110 of the chain conveyor 35 essentially as illustrated at 132.

In this example of the invention each can 21 has a bottom wall 24 adjoined by integral sidewall 25. However, it is to be understood that the transfer apparatus and method of this invention may be utilized to transfer cans of conventional construction and comprise of a plurality of components suitably fixed together in a known manner.

While present exemplary embodiments of this invention, and methods of practicing the same, have been illustrated and described, it will be recognized that this invention may be otherwise variously embodied and practiced by those skilled in the art.

What is claimed is:

1. An apparatus for transferring articles from an input device to an associated machine, said apparatus comprising, a pickup wheel for receiving articles from said device, said pickup wheel being driven by said device in synchronized relation therewith, a conveyor for feeding said articles to said machine, a conveyor feed wheel for feeding articles on said conveyor in a predetermined spaced relation, and an intermediate wheel for transferring said articles between said pickup wheel and feed wheel, said conveyor, feed wheel, and intermediate wheel being driven by said machine in synchronized relation, said intermediate wheel being adapted to serially receive each article from said pickup wheel with said device and machine operating independently of each other.

2. An apparatus as set forth in claim 1 and further comprising another pickup wheel driven by another input device which provides articles which are substantially identical to said first-named articles, another conveyor feed wheel for feeding articles on said conveyor in a predetermined spaced relation and alternately with the feeding by said first-named feed wheel, and another intermediate wheel for transferring said articles between said other pickup wheel and other feed wheel, said other feed wheel and other intermediate wheel being driven by said machine in a synchronized manner with said conveyor.

3. An apparatus as set forth in claim 1 in which each of said wheels has a plurality of article supporting cradles provided on the outer circumference thereof, each of said cradles having at least one fluid passage communicating therewith, and a fluid system operatively connected to each passage to enable holding each article within its cradle by vacuum.

4. An apparatus as set forth in claim 1 in which said conveyor comprises an endless conveyor having a plurality of equally spaced article supports, said conveyor having a portion thereof supported to provide substantially horizontal movement of said supports, and said conveyor feed wheel being synchronized to deposit articles on said supports by gravity during said horizontal movement thereof.

5. An apparatus as set forth in claim 1 in which said machine has an infeed wheel provided with equally spaced articles supporting cradles adapted to receive articles from said conveyor and said conveyor has a plurality of article supports which are equally spaced on said conveyor to correspond to the equal spacing of said article supporting cradles.

6. An apparatus as set forth in claim 5 in which said conveyor comprises a chain conveyor and has an end sprocket arranged adjacent said infeed wheel, said end sprocket having a radius which is correlated with both the radius of said infeed wheel and the configuration of said supports to enable smooth transfer of articles from said conveyor to said infeed wheel by gravity.

7. An apparatus as set forth in claim 1 and further comprising a positive nonslipping drive system operatively connected between said machine and said conveyor, feed wheel, and intermediate wheel.

8. An apparatus as set forth in claim 7 in which said drive system comprises a chain drive system providing positive synchronized movements of its associated components with a minimum stress buildup in said components.

9. An apparatus for transferring articles from a plurality of input devices to a machine which performs additional operations on said articles, said apparatus comprising, a plurality of pickup wheels corresponding in number to said plurality of devices, each of said pickup wheels receiving articles from an associated device and being driven by its device in synchronized relation therewith, a conveyor for feeding said articles to said machine, a plurality of feed wheels corresponding in number to said plurality of devices, each of said feed wheels feeding said articles on said conveyor in a predetermined spaced relation, and a plurality of intermediate wheels corresponding in number to said plurality of devices, each intermediate wheel transferring articles between its associated pickup wheel and feed wheel, said conveyor, feed wheels, and intermediate wheels being driven by said machine in synchronized relation, each of said intermediate wheels being adapted to serially receive each article from its associated pickup wheel with said devices operating independently of each other and independently of said machine.

10. An apparatus as set forth in claim 9 in which each of said wheels has a plurality of article supporting cradles provided on the outer circumference thereof, each of said cradles having at least one fluid passage communicating therewith, and means connecting each passage to an associated fluid system to enable holding each article within its cradle by vacuum.

11. An apparatus as set forth in claim 9 in which each of said wheels has a plurality of substantially semicylindrical article supporting cradles defined in the outer periphery thereof, a plurality of passages exiting the supporting surface of each cradle with the outlets of said passages being arranged in a substantially rectilinear path, and means connecting the passages of each cradle to a vacuum device to enable holding each article within its cradle by vacuum.

12. An apparatus as set forth in claim 9 in which said conveyor comprises an endless conveyor having a plurality of equally spaced article supports, said conveyor having a portion thereof supported to provide substantially horizontal movement of said supports, said conveyor feed wheels being synchronized to deposit articles on said supports by gravity during said horizontal movement thereof, and each feed wheel being synchronized to deposit an article every Nth support wherein N equals the number of devices defining said plurality of devices, whereby any breakdown in one or more of said devices will not require a shutdown of said machine.

13. An apparatus as set forth in claim 9 in which said articles comprise substantially cylindrical articles and each of said wheels has a plurality of cutouts in its outer periphery defining a corresponding plurality of cradles for supporting said articles.

14. An apparatus as set forth in claim 9 in which said machine has an infeed wheel provided with equally spaced article supporting cradles adapted to receive said articles from said conveyor, said conveyor comprises a chain conveyor having an end sprocket arranged adjacent said infeed wheel and having a plurality of article supports which are equally spaced on said conveyor to correspond to the equal spacing of the article supporting cradles provided on said infeed wheel, and said end sprocket has a radius which is correlated with both the radius of said infeed wheel and the configuration of said supports to enable smooth transfer of articles from said conveyor to said infeed wheel by gravity.

15. An apparatus as set forth in claim 14 in which each of said article supports comprises a semicylindrical support carried on an associated arm fixed to said chain conveyor.

16. An apparatus as set forth in claim 14 in which each of said article supports comprises a substantially trapezoidal support having a forwardly sloped portion which promotes easy transfer of an article carried thereby to said infeed wheel.

17. In combination: a can trimming machine, a plurality of can forming devices, and an apparatus for transferring cans from said devices to said trimming machine, said apparatus comprising, a plurality of pickup wheels corresponding in number to said plurality of devices, each of said pickup wheels receiving cans from an associated device and being driven by its device in synchronized relation therewith, a conveyor for feeding said cans to said machine, a plurality of feed wheels corresponding in number to said plurality of devices, each of said feed wheels feeding said cans on said conveyor in a predetermined spaced relation, and a plurality of intermediate wheels corresponding in number to said plurality of devices, each intermediate wheel transferring cans between its associated pickup wheel and feed wheel, said conveyor, feed wheels, and intermediate wheels being driven by said machine in synchronized relation, each of said intermediate wheels being adapted to serially receive each can from its associated pickup wheel with said devices operating independently of each other and independently of said machine.

18. A combination as set forth in claim 17 in which each of said wheels has a plurality of can supporting cradles provided on the outer circumference thereof, each of said cradles having at least one fluid passage communicating therewith, and means connecting each passage to an associated air system to enable holding each can within its cradle by vacuum.

19. A combination as set forth in claim 18 in which said plurality of devices comprise a plurality of drawing and ironing machines and further comprising means for moving each drawn and ironed can in a direction parallel to its longitudinal axis and then allowing it to drop by gravity into a cradle of a pickup wheel arranged therebeneath.

20. A combination as set forth in claim 17 in which said conveyor comprises an endless conveyor having a plurality of equally spaced can supports, said conveyor having a portion thereof supported to provide substantially horizontal movement of said supports, said conveyor feed wheels being synchronized to deposit cans on said supports by gravity during said horizontal movement thereof, and each feed wheel being synchronized to deposit a can every "Nth" supports wherein "N" equals the number of devices defining said plurality of devices, whereby any shutdown in one or more of said devices will not require a shutdown of said machine.

21. A combination as set forth in claim 20 in which said machine comprises an infeed star wheel provided with equally spaced can supporting cradles adapted to receive cans from said conveyor and a plurality of substantially frictionless guides cooperating with said infeed star wheel to provide efficient feeding of said cans to said machine.

22. A combination as set forth in claim 17 and further comprising a first drive chain operatively connected between said machine and said conveyor, a second drive chain driven by said first drive chain and extending longitudinally along said conveyor, and a plurality of transverse drive systems corresponding in number to said number of devices with each transverse drive system being driven by said second drive chain and driving an associated feed wheel and intermediate wheel in synchronized relation.

23. A combination as set forth in claim 22 in which each transverse drive system comprises a third drive chain driven by said second drive chain, said third drive chain driving an associated intermediate wheel, and a fourth drive chain driven by said third drive chain, said fourth drive chain driving an associated feed wheel.

24. A method of transferring cans from a plurality of can forming devices to a can trimming machine; said method comprising the steps of; operatively connecting a pickup wheel to each of said plurality of devices, each pickup wheel being adapted to receive cans from an associated device and being driven by its device in synchronized relation therewith; operatively connecting a conveyor for feeding said cans to said machine, a plurality of feed wheels corresponding in number to said plurality of devices with each of said feed wheels feeding said cans on said conveyor in a predetermined spaced relation, and a plurality of intermediate wheels corresponding in number to said plurality of devices, each intermediate wheel transferring cans between its associated pickup wheel and feed wheel; and driving said conveyor, feed wheels, and intermediate wheels in synchronized relation using said machine; each of said intermediate wheels being adapted to serially receive each can from its associated pickup wheel with said devices operating independently of each other and independently of said machine.

25. A method as set forth in claim 24 in which said wheels have a plurality of can supporting cradles provided on their outer peripheries, each intermediate wheel having at least the same number of can supporting cradles as its associated pickup wheel and each intermediate wheel being driven at a rotational speed greater than the rotational speed of the associated pickup wheel and being constructed to assure a can supporting cradle of the intermediate wheel is always available to receive a can from the associated pickup wheel even though each pickup wheel and associated intermediate wheel are driven independently.

26. A method as set forth in claim 25 in which said conveyor comprises an endless conveyor having a plurality of equally spaced can supports, and comprising the further steps of, supporting said conveyor so that a portion thereof is supported to provide substantially horizontal movement of said supports and synchronizing said conveyor feed wheels to deposit cans on said supports by gravity during said horizontal movement thereof with each feed wheel being synchronized to deposit a can every "Nth" support wherein "N" equals the number of devices defining said plurality of devices, whereby any shutdown in one or more of said devices will not require a shutdown of said machine.

27. A method as set forth in claim 25 and comprising the further step of supporting each of said cans in its associated can supporting cradle of each wheel by vacuum.

28. A method as set forth in claim 25 in which said driving step comprises driving said conveyor, feed wheels, and intermediate wheels with cooperating drive chains driven directly by the prime mover used to drive said machine.

29. A method as set forth in claim 25 and comprising the further step of moving each formed can in a direction parallel to its longitudinal axis and then allowing it to drop by gravity into a can supporting cradle of a pickup wheel arranged therebeneath.

30. A method as set forth in claim 29 in which said plurality of can forming devices comprises a plurality of drawing and ironing machines and said step of moving each formed can in a direction parallel to its longitudinal axis comprises forcefully ejecting each formed can axially against a stop and then allowing it to drop by gravity into its associated can supporting cradle.

* * * * *